March 5, 1963 T. J. BUCKLEY 3,079,969
LOCKNUTS
Filed Dec. 22, 1958
FIG.1.
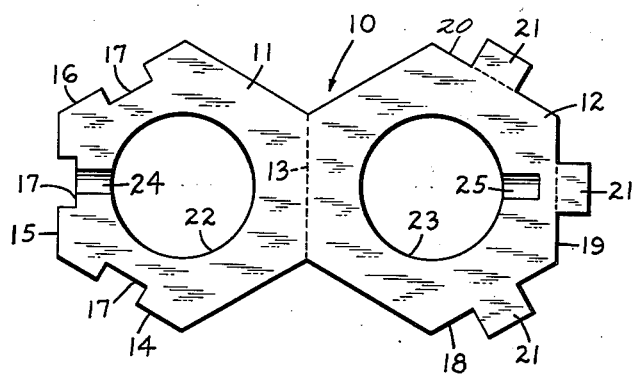
FIG.2.
FIG.3.
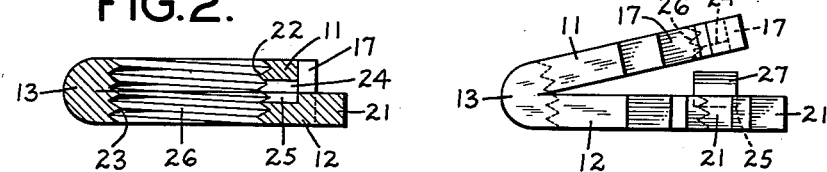
FIG.4.
FIG.6.
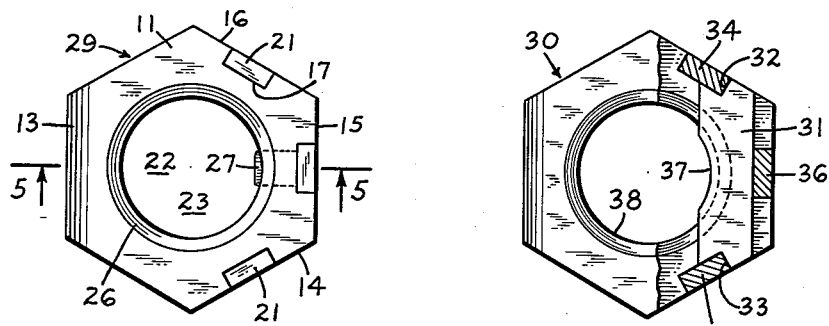
FIG.5.
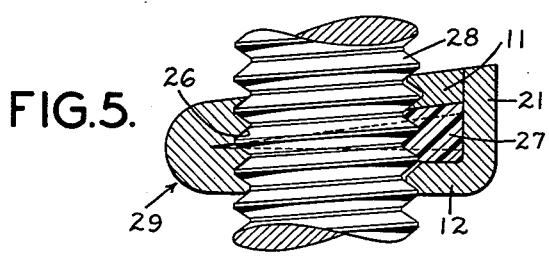
INVENTOR
TIMOTHY J. BUCKLEY
BY
HIS ATTORNEYS United States Patent Office 3,079,969
Patented Mar. 5, 1963

3,079,969
LOCKNUTS
Timothy J. Buckley, Ridgewood, N.J., assignor to The Nylok Corporation, New York, N.Y., a corporation of Delaware
Filed Dec. 22, 1958, Ser. No. 781,974
5 Claims. (Cl. 151—21)

This invention relates to improvements in threaded fastening devices and it relates particularly to improvements in light-weight locknuts.

In accordance with the present invention, lock-nuts are formed of a thin gauge metal by stamping or otherwise cutting the metal to provide two polygonal leaves joined at one edge. The leaves are folded on a line corresponding to the joined edges of the leaves so as to dispose the two leaves in face-to-face and substantially parallel relation. Holes are formed in the superimposed leaves before or after they are folded and the holes are tapped to form threads therein to receive a cooperating threaded fastening element. In order to impart locking characteristics to the nut, the two leaves are spread apart at an acute angle so that the holes therein are no longer in axial alignment and the threads in one leaf member are disposed at an angle to the threads in the other leaf member. When a threaded member such as a bolt is screwed into both of the holes, a jamming action is produced by the slight mis-match of the threads on the leaves and the threads on the bolt. The locking action produced by mis-matching of the threads is further enhanced by the presence of a resilient member such as a plug or strip of resilient plastic material such as nylon, a polyvinyl resin or the like inserted between the spaced edges of the leaves, the resilient material being arranged so that it projects slightly into or overlaps an edge of each hole and extends at least to the root lines of the threads in the holes. The resilient member is retained against outward displacement and it is deformed by a threaded element such as a bolt when it is screwed into the holes. As a result, resistance of the resilient material to deformation forces the threaded element and the nut member laterally with respect to each other so that the threads of the bolt and nut on the side opposite from the zone of engagement of the resilient material and the bolt are forced into tight engagement whereby the cohesion between the metal surfaces produces a strong locking action.

Locknuts of the type embodying the present invention can be made from relatively thin metal and they are adapted to many uses where low-weight and a strong locking action are required.

For a better understanding of the present invention, reference may be had to the accompanying drawings in which:

FIGURE 1 is a plan view of a metal blank from which a typical locknut embodying the present invention can be made;

FIGURE 2 is a view in cross-section of the nut in a partially completed stage;

FIGURE 3 is a view in side elevation of the locknut in a later stage of completion;

FIGURE 4 is a plan view of a completed locknut of the type embodying the present invention;

FIGURE 5 is a view in cross-section through the nut illustrating the locking action of the nut with respect to a bolt threaded therein, only a portion of the bolt being shown therein; and FIGURE 6 is a plan view of a modified form of the nut shown partly broken away to disclose details thereof.

The invention will be described with reference to the preparation of an hexagonal locknut, but it will be understood that square, octagonal or other shapes can be produced in the same way.

As shown in FIGURE 1, an hexagonal locknut is formed from a blank 10 of metal such as, for example, sheet steel, stainless steel or the like, depending upon the requirements of the field of use. The blank consists of two hexagonal leaves 11 and 12 which are joined at a common edge indicated by the dotted line 13. Three outer edges 14, 15 and 16 of the leaf 11 are provided with notches 17 therein. The corrsponding edges 18, 19 and 20 of the leaf 12 are provided with outwardly extending tabs 21 of a width complemental to the width of the notches 17 and a thickness corresponding to the thickness of the blank 10.

Holes 22 and 23 may be formed in the leaves 11 and 12 during the stamping of the blank 10 from a sheet or strip of metal or at a later stage, as described hereinafter. Moreover, concave indentations or grooves 24 and 25 are formed in the surface of the blank on opposite sides of and substantially radially of the holes 22 and 23. The blank 10 is folded on the fold line 13 so that the leaves 11 and 12 are brought into face-to-face relation and substantially parallel as indicated in FIGURE 2. With the holes 22 and 23 in alignment, a tap is run through them to form threads 26 in the holes. It will be understood that the holes 22 and 23 may be drilled or otherwise formed after the blank 10 has been folded, instead of prior to folding, and the formation of the holes may be immediately followed by the tapping operation.

After the threads 26 have been formed in the leaves 22 and 23, the leaves are spread apart in an axial direction as shown in FIGURE 3 so that they are disposed at an acute angle to each other and the axes of the holes are misaligned and intersect at an obtuse angle. After spreading the leaves, a plug 27 of resilient material such as nylon, rubber, synthetic rubber, or the like, is placed in the groove 25 between the spaced apart ends of the leaves. As shown in FIGURE 4, the plug 25 is substantially cylindrical, is of greater diameter than the combined depths of the grooves 24 and 25 and it is of a length such that its inner end extends into said holes beyond the root lines of the threads 26 therein. Preferably, the end of the plug 27 should extend at least to the crest of the threads. After the piece of resilient material has been inserted between the leaves 11 and 12, they are squeezed together to slightly compress the material into the grooves 24 and 25 and the tabs 21 are then bent upwardly into the notches 17 to prevent lateral shifting of the leaves under stress and also to position and retain the plug 27 in position. The tabs may be swaged or otherwise reduced in cross-section somewhat during bending so that they do not extend beyond the sides of the nut.

Referring now to FIGURE 5, it will be apparent that when a threaded member such as the bolt 28 is screwed into the completed nut 29, the threads on the bolt 28 will not mesh precisely with the threads in the leaves 12 and 13, because the latter have been displaced angularly from the position in which the threads were initially formed. As a consequence, the threads 26 and the threads on the bolt 28 will tend to jam somewhat thereby exerting a strong locking action.

Engagement of the threads of the bolt 28 with the resilient material 27 also produces another supplemental locking action. Inasmuch as the threads on the bolt 28 will tend to deform the plug 27 and it is retained against bodily displacement by the grooves 24, 25 and the tab 21 behind it, the resilient material 25 resists deformation and reacts against the bolt 28 urging it powerfully into engagement with the threads at the opposite sides of the holes from the resilient plug 27. Such powerful engagement together with the strong cohesion between the metal of the nut and the metal of the threads produces a far stronger locking action than would be obtainable merely by frictional contact of the resilient plug 27 with the threads of the bolt 28. Moreover, by utilizing a resilient material, such as "nylon," the nuts are readily reusable with a retention of a high percentage of their initial locking strength even after repeated reuse.

The new unit is susceptible to modification particularly in its size and shape and also the shape of the resilient insert can be changed. As shown in FIGURE 6, a nut 30 similar to that described above, is provided with a generally trapezoidal strip 31 of reslient material between its spaced apart edges. The ends of the strip 31 have notches 32 and 33 to engage the tabs 34 and 35. The strip has an outer edge to engage the tab 36 and be positioned thereby. An arcuate notch 37 is formed in the inner edge of the strip, this notch being substantially concentric with the threads 38 in the nut 30 and extending inwardly beyond their crests.

The locking action of the nut 30 is similar to the action of the nut 29, inasmuch as the misaligned threads in the nut 30 and the reaction of the resilient strip 31 combine to secure the nut 30 firmly to a complemental threaded member.

The new locknuts are characterized by a much stronger locking action than is obtainable with the split type of nut produced heretofore and they have a greater re-usability than such prior split nuts. Due to the strong locking action obtainable through the combined effects of the resilient reaction member and the offset threads, it is possible to produce very light-weight locknuts which have high strength and a very high ability to withstand vibration and other stresses tending to loosen them.

It will be understood that locknuts of the type embodying the present invention can be made from many different kinds of materials and in different sizes and shapes depending upon requirements. Therefore, the form of the invention described herein should be considered as illustrative only.

I claim:

1. A locknut comprising a pair of metal leaves connected at one edge and displaced axially and diverging from said one edge, said leaves having threaded holes therein having their axes intersecting at an obtuse angle to exert a jamming action on a threaded element threaded therein, a piece of thread impressionable, resilient material disposed between said leaves at one side of said holes spaced from said connected edge and extending inwardly beyond the root lines of the threads in said holes for engagement with one side only of said threaded element to urge said threaded element transversely of said holes, said piece being of greater width than the space between said leaves at said one side to oppose movement of said leaves toward each other.

2. The locknut set forth in claim 1 in which said piece of resilient material is mounted between said leaves on the opposite side of said holes from the connected edges of said leaves and comprising means on at least one of said leaves engaging said piece and retaining it between said leaves and against movement outwardly from between said leaves.

3. A locknut comprising a pair of sheet metal leaves integrally connected at one edge and diverging from each other from said connected edge, each leaf having a threaded hole therethrough perpendicular to it, said holes being of the same diameter and the threads being of the same pitch, said leaves having opposed recesses therein on the opposite side of said holes from said connected edges of said leaves, the recesses intersecting said holes, a piece of thread impressionable resilient material in and of larger size than said recesses whereby said leaves are maintained apart, said piece having one end extending into said holes beyond the root line of the threads therein for engagement by a threaded element threaded into said holes.

4. The locknut set forth in claim 3 comprising a tab on at least one edge other than said connected edge of one of said leaves extending laterally therefrom into engagement with the other leaf to maintain said leaves against lateral displacement.

5. A lock nut comprising a pair of sheet metal leaves connected at one edge in inclined relation to each other, said leaves having threaded holes therein to receive a complementally-threaded element and being displaced axially to dispose the axes of said holes in inclined, intersecting relation, a piece of thread impressionable resilient material disposed between said leaves at one side of said holes spaced from said one edge, said piece being of greater thickness than the space between said leaves at said one side to maintain said leaves in inclined relation and extending inwardly beyond the root lines of the threads in said holes for engagement with one side only of said threaded element to urge said threaded element transversely of said holes, and a tab extending laterally from one of said leaves toward and at least partially overlapping an edge of the other leaf and abutting an outer portion of said piece of material to retain it between said leaves.

References Cited in the file of this patent

UNITED STATES PATENTS

| | | |
|---|---|---|
| 529,034 | Leidgen | Nov. 13, 1894 |
| 678,629 | Smith | July 16, 1901 |
| 1,260,645 | Cochran | Mar. 26, 1918 |
| 1,516,721 | Emery | Nov. 25, 1924 |
| 1,852,203 | Easter | Apr. 5, 1932 |
| 2,410,995 | Olson | Nov. 12, 1946 |
| 2,462,603 | Boots | Feb. 22, 1949 |
| 2,684,703 | Crowther | July 27, 1954 |

FOREIGN PATENTS

| | | |
|---|---|---|
| 711,612 | France | Sept. 14, 1931 |
| 850,193 | France | Dec. 9, 1939 |